(12) United States Patent
Yoo

(10) Patent No.: US 11,468,423 B2
(45) Date of Patent: Oct. 11, 2022

(54) METHOD, PROGRAM, SERVER, WEARABLE DEVICE FOR PROVIDING WEARABLE DEVICE-BASED FINANCIAL TRANSACTION

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 0 days.

(21) Appl. No.: 17/393,611

(22) Filed: Aug. 4, 2021

(65) Prior Publication Data

US 2021/0365921 A1  Nov. 25, 2021

Related U.S. Application Data

(63) Continuation of application No. PCT/KR2020/003189, filed on Mar. 6, 2020.

(30) Foreign Application Priority Data

| Feb. 8, 2019 | (KR) | 10-2019-0015223 |
| Apr. 12, 2019 | (KR) | 10-2019-0043118 |
| Aug. 30, 2019 | (KR) | 10-2019-0107065 |
| Jan. 17, 2020 | (KR) | 10-2020-0006286 |

(51) Int. Cl.
*G06Q 30/00* (2012.01)
*G06Q 20/32* (2012.01)
(Continued)

(52) U.S. Cl.
CPC ........... *G06Q 20/321* (2020.05); *G06Q 20/02* (2013.01); *G06Q 20/3278* (2013.01); *G06F 1/163* (2013.01); *G06Q 20/385* (2013.01); *G06Q 20/409* (2013.01); *G06Q 20/40145* (2013.01)

(58) Field of Classification Search
CPC ...................................................... G06Q 20/32
(Continued)

(56) References Cited

U.S. PATENT DOCUMENTS

| 9,710,804 B2 * | 7/2017 | Zhou | ..................... G06Q 20/321 |
| 2017/0230794 A1 * | 8/2017 | Ramamurthy | ...... H04L 67/1046 |

FOREIGN PATENT DOCUMENTS

| JP | 2008-204248 A | 9/2008 |
| KR | 10-1316466 B1 | 10/2013 |

(Continued)

OTHER PUBLICATIONS

ProQuestDialogNPLSearch History.*

(Continued)

*Primary Examiner* — John H. Holly
(74) *Attorney, Agent, or Firm* — Studebaker & Brackett PC

(57) ABSTRACT

The present invention provides a method, program, server, and wearable device that may generate a virtual code, which is not matched with any other code, whenever a payment is requested. Furthermore, the present invention provides a method, program, server, and wearable device that may conveniently add a device while security is maintained, when a user wants to add a device capable of being used as a payment means. Moreover, the present invention provides a method, program, server, and wearable device that may add and use only an algorithm without changing a conventional process, and may provide a wearable device-based financial transaction.

10 Claims, 10 Drawing Sheets

(51) Int. Cl.
  *G06Q 20/02* (2012.01)
  *G06F 1/16* (2006.01)
  *G06Q 20/38* (2012.01)
  *G06Q 20/40* (2012.01)

(58) Field of Classification Search
  USPC ............ 705/44, 1.1, 23; 455/569, 433, 456; 235/462, 375, 472
  See application file for complete search history.

(56) References Cited

FOREIGN PATENT DOCUMENTS

| KR | 10-1354388 B1 | 1/2014 |
| KR | 10-2014-0101322 A | 8/2014 |
| KR | 10-2015-0072955 A | 6/2015 |
| KR | 10-2016-0105261 A | 9/2016 |
| KR | 10-2017-0043377 A | 4/2017 |
| KR | 10-1751894 B1 | 7/2017 |
| KR | 10-2019-0005985 A | 1/2019 |
| KR | 10-1978812 B1 | 5/2019 |

OTHER PUBLICATIONS

International Search Report issued in PCT/KR2020/003189; dated Jun. 15, 2020.
Written Opinion issued in PCT/KR2020/003189; dated Jun. 15, 2020.
An Office Action issued by the Korean Intellectual Property Office dated Jul. 19, 2021, which corresponds to Korean Patent Application No. 10-2019-0089829; with English language translation.

* cited by examiner

100

200

300

METHOD, PROGRAM, SERVER, WEARABLE DEVICE FOR PROVIDING WEARABLE DEVICE-BASED FINANCIAL TRANSACTION

CROSS-REFERENCE TO RELATED APPLICATIONS

The present application is a continuation of International Patent Application No. PCT/KR2020/003189, filed on Mar. 6, 2020, which is based upon and claims the benefit of priority to Korean Patent Application Nos. 10-2019-0015223, filed on Feb. 8, 2019, 10-2019-0043118, filed on Apr. 12, 2019, 10-2019-0107065, filed on Aug. 30, 2019 and 10-2020-0006286, filed on Jan. 17, 2020. The disclosures of the above-listed applications are hereby incorporated by reference herein in their entirety.

BACKGROUND

Embodiments of the present invention described herein relate to a method, program, server, and wearable device for providing a wearable device-based financial transaction.

Code-type data is being used in various fields. In addition to a card number or account number used to make a payment, the code type data includes an IPIN number, a resident registration number, or the like for user identification.

However, the code data may be leaked when the code data is used. In the case of a card number, because an actual card number is recorded on a card surface as it is, the actual card number is visually exposed to other people. When a payment using a magnet is made, the card number is leaked to other people while being transmitted to a POS device.

A virtual code has been used to prevent the actual code from being leaked. However, there is a need for data for identifying a user to search for the actual code corresponding to the virtual code. For example, a code of one-time-password (OTP) is changed and generated every time. However, a login procedure is needed to determine an algorithm assigned to the user, and thus it is difficult for OTP to be applied to various fields.

Recently, wearable devices having a function as a payment means have appeared in various shapes. However, a wearable device having a conventional payment function may be used only for an offline payment due to security issues. In addition, it is difficult to apply the wearable device to an online payment.

SUMMARY

Embodiments of the present invention provide a method, program, server, and wearable device that may generate a virtual code, which is not matched with any other code, whenever a payment is requested.

Furthermore, embodiments of the present invention provide a method, program, server, and wearable device that may conveniently add a device while security is maintained, when a user wants to add a device capable of being used as a payment means.

Moreover, embodiments of the present invention provide a method, program, server, and wearable device that may add and use only an algorithm without changing a conventional process, and may provide a wearable device-based financial transaction.

The technical problems to be solved by the present present invention are not limited to the aforementioned problems, and any other technical problems not mentioned herein will be clearly understood from the following description by those skilled in the art to which the present invention pertains.

According to an embodiment, a method for providing a wearable device-based financial transaction, which is performed by a virtual code verification server including a virtual code verification means includes receiving a virtual code generated by a virtual code generation module, a wearable device that performs an offline payment based on short-range communication being registered in the virtual code generation module, and the wearable device does not output a payment code to an outside, searching for a storage space, in which the payment code of the wearable device is stored, based on the virtual code, and transmitting the payment code to a payment server. The virtual code is a random code changed per unit time and includes information for searching for the storage space where the payment code is stored. The payment code is code data assigned to the wearable device or an actual card number matching the wearable device.

Furthermore, in the method, the virtual code may be generated by a virtual code generation function based on seed data obtained as being tagged by the wearable device in the virtual code generation module.

Moreover, in the method, the virtual code may be output to the outside by the virtual code generation module to make an online payment. The receiving of the virtual code may include receiving the virtual code output to the outside.

Also, in the method, the wearable device may be registered based on a partnership with each wearable device company.

Besides, in the method, the virtual code may be generated by combining a plurality of detailed codes. The plurality of detailed codes may have a correlation for searching for the storage space. The searching for the storage space may include extracting, by a storage space search algorithm included in the virtual code verification means, the plurality of detailed codes included in the virtual code and searching for the storage space connected to a user identification (UID) assigned to the wearable device based on the plurality of detailed codes.

In addition, in the method, the storage space search algorithm may search for the storage space by passing waypoints corresponding to one or more detailed codes among the plurality of detailed codes and performing a calculation based on a correlation between the plurality of detailed codes from the waypoints.

Furthermore, in the method, the plurality of detailed codes may include a first code and a second code. The storage space search algorithm may search for the storage space by passing a waypoint corresponding to the first code and performing a calculation based on a correlation between the first code and the second code from the waypoint.

According to an embodiment, a server providing a wearable device-based financial transaction includes a virtual code reception unit that receives a virtual code generated by a virtual code generation module, a wearable device that performs an offline payment based on short-range communication being registered in the virtual code generation module, and the wearable device that does not display a payment code to an outside, a storage space search unit that searches for a storage space, in which the payment code of the wearable device is stored, based on the virtual code and a payment code transmission unit that transmits the payment code to a payment server. The virtual code is a random code changed per unit time and includes information for searching for the storage space where the payment code is stored. The payment code is code data assigned to the wearable device or an actual card number matching the wearable device.

According to an embodiment, a method for providing a wearable device-based financial transaction, which is performed by a virtual code verification server including a virtual code verification means includes receiving a virtual code generated by a user terminal or a wearable device, searching for a storage space, which is connected to a UID assigned to the user terminal or the wearable device and in which a payment code is stored, based on the virtual code, and transmitting the payment code to a payment server. The virtual code is a random code changed per unit time and includes information for searching for the storage space where the payment code is stored. The payment code is code data or an actual card number for generating a financial transaction.

Furthermore, in the method, the user terminal or the wearable device may generate the virtual code and may transmit the generated virtual code to the payment server or outputs the generated virtual code to an outside.

Furthermore, in the method, the user terminal and the wearable device may receive the same UID.

Furthermore, in the method, the user terminal and the wearable device may receive different UIDs. Each of the different UIDs may be connected to the same storage space.

According to an embodiment, a server providing a wearable device-based financial transaction includes a virtual code reception unit that receives a virtual code generated by a user terminal or a wearable device, a storage space search unit that searches for a storage space, which is connected to a UID assigned to the user terminal or the wearable device and in which a payment code is stored, based on the virtual code, and a payment code transmission unit that transmits the payment code to a payment server. The virtual code is a random code changed per unit time and includes information for searching for the storage space where the payment code is stored. The payment code is code data or an actual card number for generating a financial transaction.

According to an embodiment, a wearable device providing a financial transaction includes a detailed code generation unit that generates a plurality of detailed codes, a virtual code generation unit that generates a virtual code by combining the plurality of detailed codes, and a virtual code provision unit that transmits the virtual code to a payment server or to output the virtual code to an outside. The virtual code is a random code changed per unit time. The plurality of detailed codes have a correlation for searching for a storage space, which is connected to a UID assigned to a user terminal or a wearable device and in which a payment code is stored. The payment code is code data or an actual card number for generating the financial transaction.

According to an embodiment, a wearable device-based financial transaction providing program is stored in a medium to be combined with a computer which is hardware and to perform a method of any claim among the methods.

Other details according to an embodiment of the present invention are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
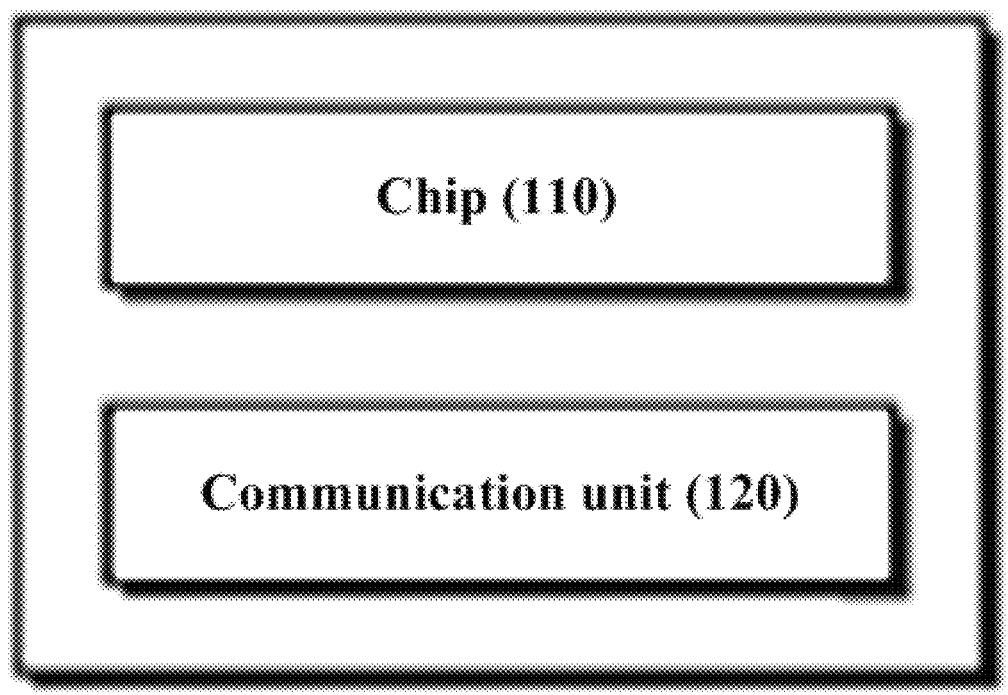
FIG. 1 is a block diagram of a first wearable device, according to an embodiment of the present invention.

The above and other aspects, features and advantages of the present invention will become apparent from the following description of the following embodiments given in conjunction with the accompanying drawings. The present invention, however, may be embodied in various different forms, and should not be construed as being limited only to the illustrated embodiments. Rather, these embodiments are provided as examples so that the present invention will be thorough and complete, and will fully convey the concept of the present invention to those skilled in the art. The present invention may be defined by scope of the claims.

The terminology used herein is for the purpose of describing embodiments and is not intended to limit the present invention. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the present invention.

Unless otherwise defined, all terms (including technical and scientific terms) used herein have the same meaning as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In this specification, a "wearable device" refers to a device capable of being used or carried by being attached to or worn on a body. For example, the wearable device may be implemented in various shapes such as a smart watch, a watch, a bracelet, an anklet, a ring, a necklace, glasses, shoes, clothing, or the like, but is not limited thereto. The wearable device includes any shape capable of being attached to or worn on a body.

In this specification, a "character" is a component constituting a code and includes all or part of uppercase alphabet characters, lowercase alphabet characters, numerals, and special characters.

In this specification, a "code" refers to a string of characters.

In this specification, "code data" is data for a value uniquely assigned to a wearable device.

In this specification, a "code for making a payment" (hereinafter, referred to as a "payment code") is an arbitrary code capable of generating a payment, and includes code data assigned to a wearable device or an actual card number matched with the wearable device, but not limited thereto.

In this specification, a "virtual code" is a random code that is temporarily generated and changed per unit time so as to be used to search for a payment code storage space, and refers to a code having specific digits composed of characters.

In this specification, a "detailed code" refers to a code used to generate a virtual code. That is, when the virtual code is generated by combining a plurality of code that are separately generated, the detailed code refers to a respective code that is separately generated and constitutes the virtual code.

In this specification, a "virtual code generation function" refers to a function used to generate a virtual code.

In this specification, a "detailed code generation function" refers to a function for generating each detailed code constituting a virtual code.

In this specification, a "detailed code combination function" refers to a function for generating a virtual code by combining or coupling a plurality of detailed codes.

Hereinafter, embodiments of the present invention will be described in detail with reference to accompanying drawings.

In this specification, according to embodiments, wearable devices are divided into a first wearable device 100 and a second wearable device.

The "first wearable device 100" is a wearable device capable of performing a financial transaction, and is a wearable device that is incapable of directly generating a virtual code and is incapable of outputting a payment code to the outside. For example, the first wearable device 100 may be a wearable device, which receives code data capable of generating a financial transaction or code data matched with an actual card number, performs an offline payment based on short-range communication, or performs an online payment in conjunction with a virtual code generation module 200, but is not limited thereto.

The "second wearable device" is a wearable device capable performing a financial transaction, and is a wearable device (e.g., a smart watch) capable of directly generating a virtual code. That is, unlike the first wearable device, the second wearable device is a wearable device capable of directly operating as the virtual code generation module 200. An embodiment based on the second wearable device will be described later with reference to FIGS. 8 to 10.

FIG. 1 is a block diagram of the first wearable device 100, according to an embodiment of the present invention.

Referring to FIG. 1, the first wearable device 100 according to an embodiment of the present invention includes a chip 110 and a communication unit 120.

The chip 110 stores and manages code data assigned to a device. The shape of the chip 110 is not limited, and includes any shape such as a part including an integrated circuit (IC), a system on chip (SoC), or the like.

The code data may serve as a payment code by itself and may be used to make a payment through an account or pre-paid service, which matches the code data.

In addition, the code data may be used to make a payment through a payment code matching the code data. For example, the payment code is code data assigned to the first wearable device 100 or an actual card number matching the first wearable device 100. At this time, the actual card number includes a card number assigned to a credit card, a check card, and a pre-paid card. There is no limitation on the type and form of a card.

In an embodiment, the chip 110 may additionally store and manage information (e.g., a chip eigenvalue assigned to each device) about a device. The chip eigenvalue is a value assigned differently so as not to be matched with any other chip eigenvalue for each device at a specific point in time (e.g., at the time of manufacture or at the time of registration). For example, there is a serial number assigned differently to each device, an IC eigenvalue, a device identification value of a mobile device in which an app card is installed, ICCID or IMSI of a subscriber identification module (SIM) card, or an unique number of a semiconductor chip. It is not limited to the above-mentioned example. The chip eigenvalue is any value for identifying a device.

To generate a virtual code that is not matched with any other virtual code, the virtual code generation module 200 may obtain a chip eigenvalue from the first wearable device 100 and may generate a detailed code and a virtual code by using the obtained chip eigenvalue as seed data. In this case, a verification server 300 may search for and extract a chip eigenvalue from the received virtual code, and then may extract a UID matching the corresponding chip eigenvalue.

In another embodiment, the chip 110 may be disposed inside a wearable device or may be disposed exposed to the outside. For example, the chip 110 may be disposed exposed to the outside in the form of an IC chip. In this case, the chip 110 may make an IC-based payment in conjunction with a POS device. That is, when a portion on which the chip 110 in a form of an IC chip exposed to the outside is disposed is inserted into the POS device, and then contacts the POS device. Then, an offline payment may be made by delivering internally-stored code data to the POS device.

In another embodiment, a smart card or wearable device may include a fingerprint recognition unit (not shown) capable of recognizing a user's fingerprint. That is, when an offline payment is made, a user is authenticated as a legitimate user by touching the fingerprint recognition unit by using his/her finger (e.g., thumb), and then a payment is made. The fingerprint recognizing unit determines whether the recognized fingerprint is the same as the previously-registered fingerprint of the user. When two fingerprints are the same as each other, the fingerprint recognizing unit approves to make a payment. Otherwise, the fingerprint recognizing unit may not transmit code data such that the payment is not made anymore. Accordingly, security may be improved by adding a user's fingerprint check procedure when a payment is made.

At this time, for the purpose of initially registering the user's fingerprint, a wearable device may be delivered while being connected to a shipping case including a battery. That is, when a user receives or purchases an empty card, the wearable device is connected to a disposable battery embedded in the shipping case. The user may register a fingerprint in a fingerprint recognizing unit by using an electrical signal supplied through the disposable battery.

The communication unit 120 may provide code data to the virtual code generation module 200 by communicating with the virtual code generation module 200. Near Field Communication (NFC), Bluetooth, Bluetooth Low Energy (BLE), Beacon, Radio Frequency Identification (RFID), Infrared Data Association (IrDA), Ultra Wideband (UWB), ZigBee, or the like may be used as the wireless communication scheme of the communication unit 120.

For example, as the communication unit 120 approaches a store terminal (e.g., a POS device) capable of NFC communication, the communication unit 120 may transmit the code data stored in the chip 110 to the store terminal.

As another example, as the communication unit 120 approaches (e.g., tagging or tapping) the virtual code generation module 200 capable of NFC communication, the communication unit 120 may transmit code data stored in the chip 110 to the virtual code generation module 200. The virtual code generation module 200 may generate a virtual code by using the obtained code data as seed data. In other words, the virtual code may be generated by a virtual code generation function based on the seed data obtained by being tagged by the first wearable device 100 in the virtual code generation module 200. At this time, the generated virtual code may be output to the outside by the virtual code generation module 200 to make an online payment. The verification server 300 may receive the virtual code by receiving the externally-output virtual code from the user. To this end, the first wearable device 100 may be registered in the virtual code generation module 200 based on partnerships with each wearable device company.

Figure 2:
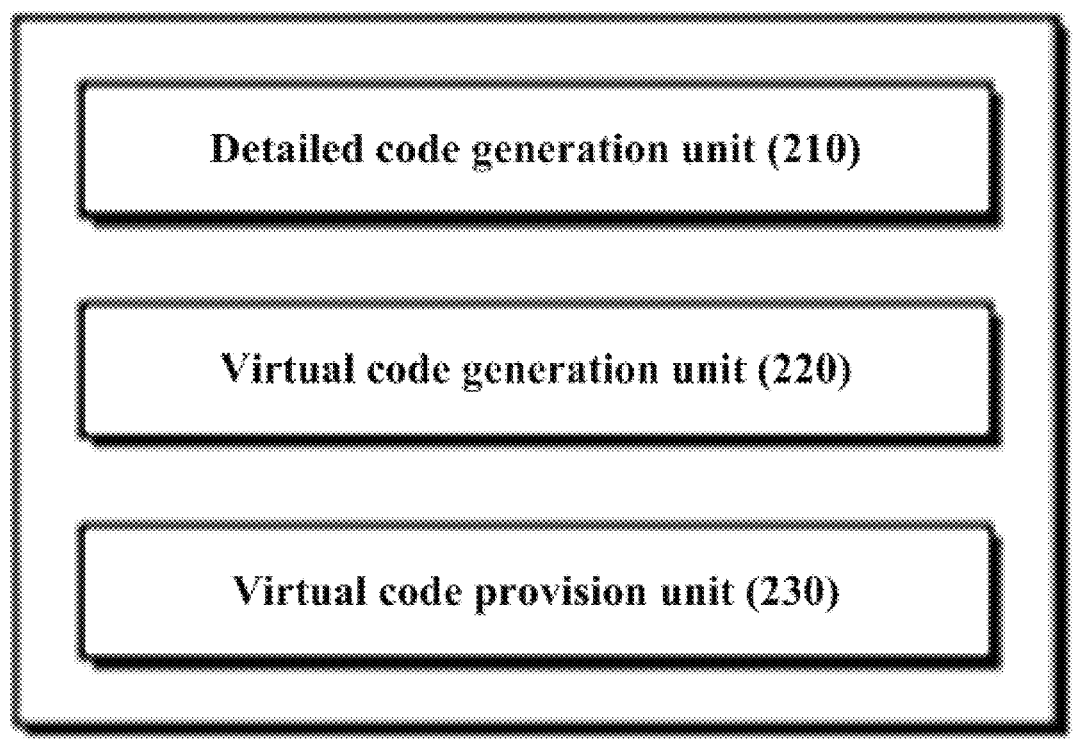
FIG. 2 is a block diagram of a virtual code generation module, according to an embodiment of the present invention.

FIG. 2 is a block diagram of the virtual code generation module 200, according to an embodiment of the present invention.

A virtual code is a random code changed per unit time, and is a code including information for searching for a storage space where a payment code is stored.

In the meantime, for example, the payment code (e.g., code data, which is assigned to a wearable device and which is used to make a payment, or an actual card number matched with the wearable device) of the first wearable device 100 may be stored in the storage space connected to a UID assigned to the first wearable device 100 at a specific point in time (e.g., a product manufacturing time, a user registration time, a payment method registration time, or the like).

The verification server 300 may search for the UID assigned to the first wearable device 100 through a search algorithm, and then may store the payment code in the storage space connected to the found UID.

Also, the first wearable device 100 may change and manage the payment code by communicating with the verification server 300 in conjunction with the virtual code generation module 200.

The virtual code generation module 200 is any device, module, or processor that generates a virtual code. For example, the virtual code generation module 200 is a device, module, or processor in which software corresponding to a virtual code generation means is capable of being installed or embedded.

For example, the virtual code generation module 200 is a mobile device in which an application corresponding to the virtual code generation means is installed. That is, the virtual code generation module 200 may be a smart phone, a smart pad, a tablet PC, or a wearable device (corresponding to a second wearable device) as a user terminal.

Referring to FIG. 2, according to another embodiment of the present invention, the virtual code generation module 200 includes a detailed code generation unit 210, a virtual code generation unit 220, and a virtual code provision unit 230.

The detailed code generation unit 210 generates one or more detailed codes.

The virtual code generation module 200 includes a virtual code generation function for generating a virtual code. The virtual code generation function includes a detailed code generation function for generating one or more detailed codes, and a detailed code combination function (i.e., a rule for combining a plurality of detailed codes) for generating a virtual code by combining the detailed codes.

In other words, when the virtual code includes a plurality of detailed codes, the virtual code generation function generates a plurality of detailed codes by using a plurality of detailed code generation functions, and generates the virtual code by using the detailed code combination function that combines the plurality of detailed codes.

In an embodiment, the detailed code generation unit 210 generates one or more detailed codes based on code data obtained from the first wearable device 100. In other words, the one or more detailed codes may be generated by the detailed code generation function based on the seed data obtained by being tagged by the first wearable device 100 in the virtual code generation module 200.

In another embodiment, the detailed code generation unit 210 generates one or more detailed codes from the first wearable device 100 by using an eigenvalue of the chip 110 included in the first wearable device 100. For example, a detailed code among the plurality of detailed codes may be generated as an OTP code. At this time, the OTP code may be generated by using the eigenvalue of the chip 110 included in the first wearable device 100 as seed data.

In this way, even though detailed codes are generated at the same point in time, the detailed codes that are different for each user or device may be generated. In detail, when a plurality of detailed codes include a first code and a second code, the detailed code generation unit 210 may generate an OTP code by using the eigenvalue of the chip 110 inside the first wearable device 100 as seed data, and may generate the second code based on the OTP code. Accordingly, the detailed code generation unit 210 may generate the second code, which is not matched with any other code, for each user or device at the same point in time.

The plurality of detailed codes have a correlation used for the virtual code generation module 200 to search for a payment code storage space. In other words, the verification server 300 includes a search algorithm (a storage space search algorithm). The search algorithm extracts a plurality of detailed codes included in the virtual code received from the virtual code generation module 200, searches for the payment code storage space connected to a UID assigned to the first wearable device 100 based on the plurality of detailed codes, extracts the payment code stored in the found storage space, and transmits the extracted payment code to a payment server 400. Accordingly, the search algorithm performs a payment.

As an example of a correlation between a plurality of detailed codes, the search algorithm included in the verification server 300 may pass waypoints corresponding to one or more detailed codes among a plurality of detailed codes, may perform a calculation based on the correlation between the plurality of detailed codes from the waypoints, and thus may search for a storage location of an actual code. At this time, there are one or more waypoints. There is no limitation to the number and order of waypoints.

Furthermore, as an example of a plurality of detailed codes, the plurality of detailed codes may include a first code and a second code. The detailed code generation unit 210 includes a first function and a second function as detailed code generation functions so as to generate the first code and the second code. The first code and the second code may have a correlation for searching for a storage space of the payment code within the verification server 300. However, the virtual code generation module 200 may only include the first function for generating the first code and the second function for generating the second code as the detailed code generation functions to improve security, and may not include data for the correlation between the first code and the second code.

As a specific example of the correlation between the first code and the second code, each of the first code and the second code may be used to search for a payment code storage space. The first code may include information about a waypoint. The second code may include information necessary for calculation capable of arriving from the waypoint to the storage location of the actual code. Specific examples of the first code and the second code will be described later with reference to FIG. 7.

The virtual code generation unit 220 may generate a virtual code by combining one or more detailed codes generated by the detailed code generation unit 210.

The virtual code provision unit 230 provides the virtual code to the outside. The virtual code provision unit 230 may directly provide the virtual code to the verification server 300, may provide the virtual code to a device or server that delivers the virtual code to the verification server 300, or may provide the virtual code through a display unit of the virtual code generation module 200 such that a user is capable of directly identifying and entering the virtual code.

In addition, the virtual code provision unit 230 may include various configurations capable of providing the virtual code to the outside. For example, the virtual code provision unit 230 may include all or part of a wireless Internet module, a short-range communication module, a display unit, and the like.

Figure 3:
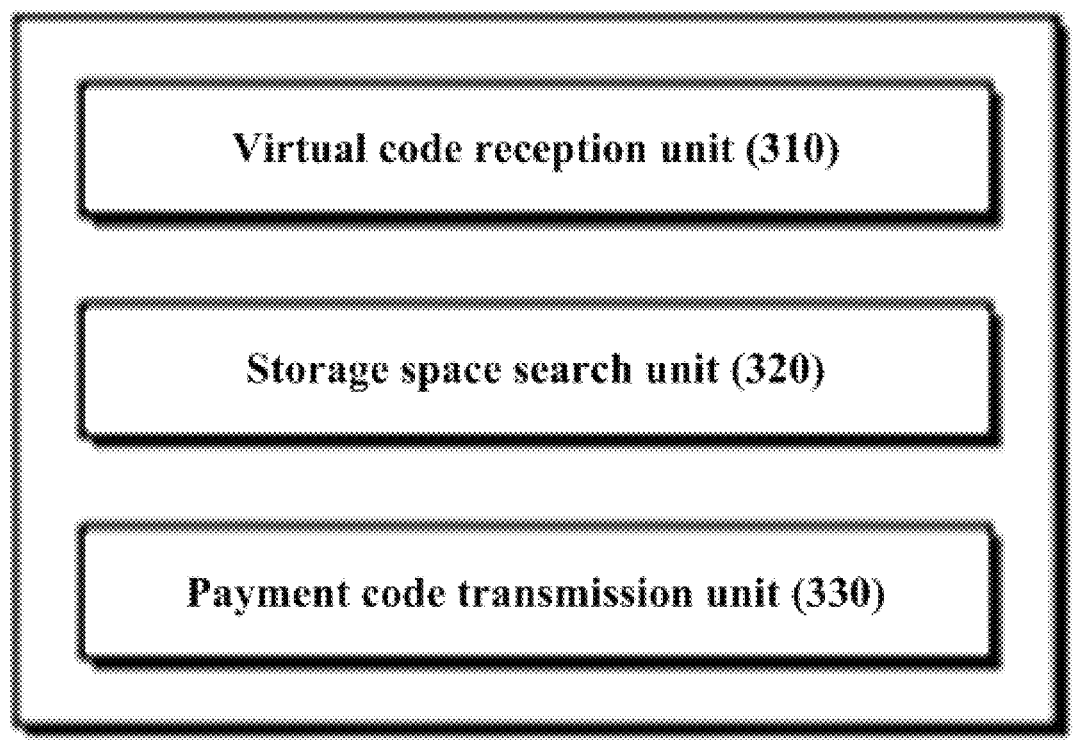
FIG. 3 is a block diagram of a verification server, according to an embodiment of the present invention.

FIG. 3 is a block diagram of a verification server, according to an embodiment of the present invention.

Referring to FIG. 3, the verification server 300 according to an embodiment of the present invention includes a virtual code reception unit 310, a storage space search unit 320, and a payment code transmission unit 330.

The virtual code reception unit 310 receives a virtual code from the virtual code generation module 200.

In an embodiment, the virtual code reception unit 310 directly receives the virtual code from the virtual code generation module 200, or may receive the virtual code generated by the virtual code generation module 200 via an intermediate server through communication with another server.

The storage space search unit 320 searches for a payment code storage space based on the received virtual code.

In an embodiment, the storage space search unit 320 may include a detailed code extraction unit (not shown). When the virtual code is generated by combining a plurality of detailed codes, the detailed code extraction unit extracts the plurality of detailed codes included in the virtual code.

For example, the detailed code extraction unit may include a detailed code combination function the same as the virtual code generation module 200 of a specific group. The detailed code extraction unit may extract the plurality of detailed codes from the virtual code by applying the corresponding detailed code combination function. For example, when the virtual code generation module 200 generates the virtual code obtained by combining two detailed codes (i.e., the first code and the second code), the detailed code extraction unit may separate the first code and the second code by applying the detailed code combination function to a character array of the virtual code.

The payment code transmission unit 330 extracts a payment code stored in the storage space found by the storage space search unit 320, and then transmits the extracted payment code to the payment server 400.

In an embodiment, unlike the illustration of FIG. 3, the verification server 300 and the payment server 400 may be integrated into one server. In other words, a server (e.g., a financial institution server), which is a subject that approves and processes a payment, may include a virtual code verification means. The server may make a payment by receiving the virtual code directly from the virtual code generation module 200 and searching for the payment code storage space. In this case, the payment code transmission unit 330 may not be provided.

Figure 4:
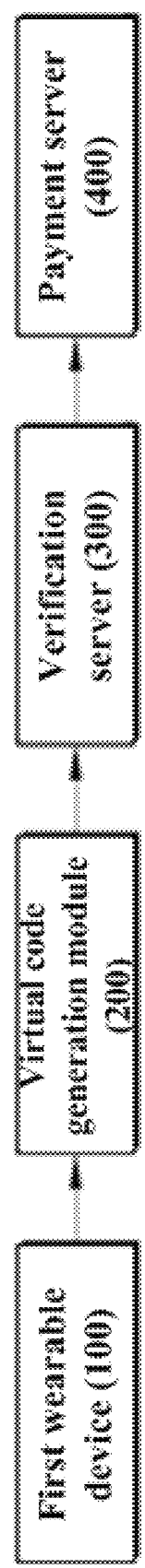
FIG. 4 is a block diagram of a system for providing a financial transaction based on a first wearable device, according to an embodiment of the present invention.

FIG. 4 is a block diagram of a system for providing a financial transaction based on the first wearable device 100, according to an embodiment of the present invention.

Referring to FIG. 4, in a system that provides a financial transaction based on the first wearable device 100 according to an embodiment of the present invention, a process of performing a financial transaction is as follows. The first wearable device 100 delivers seed data (code data) for generating a virtual code to the virtual code generation module 200. The virtual code generation module 200 generates a virtual code by using the code data received from the first wearable device 100 as seed data, and transmits the virtual code to the verification server 300.

The verification server 300 searches for a payment code storage space based on the virtual code received from the virtual code generation module 200, extracts the payment code stored in the found storage space, and transmits the extracted payment code to the payment server 400. The payment server 400 performs a financial transaction based on the payment code received from the verification server 300.

Figure 5:
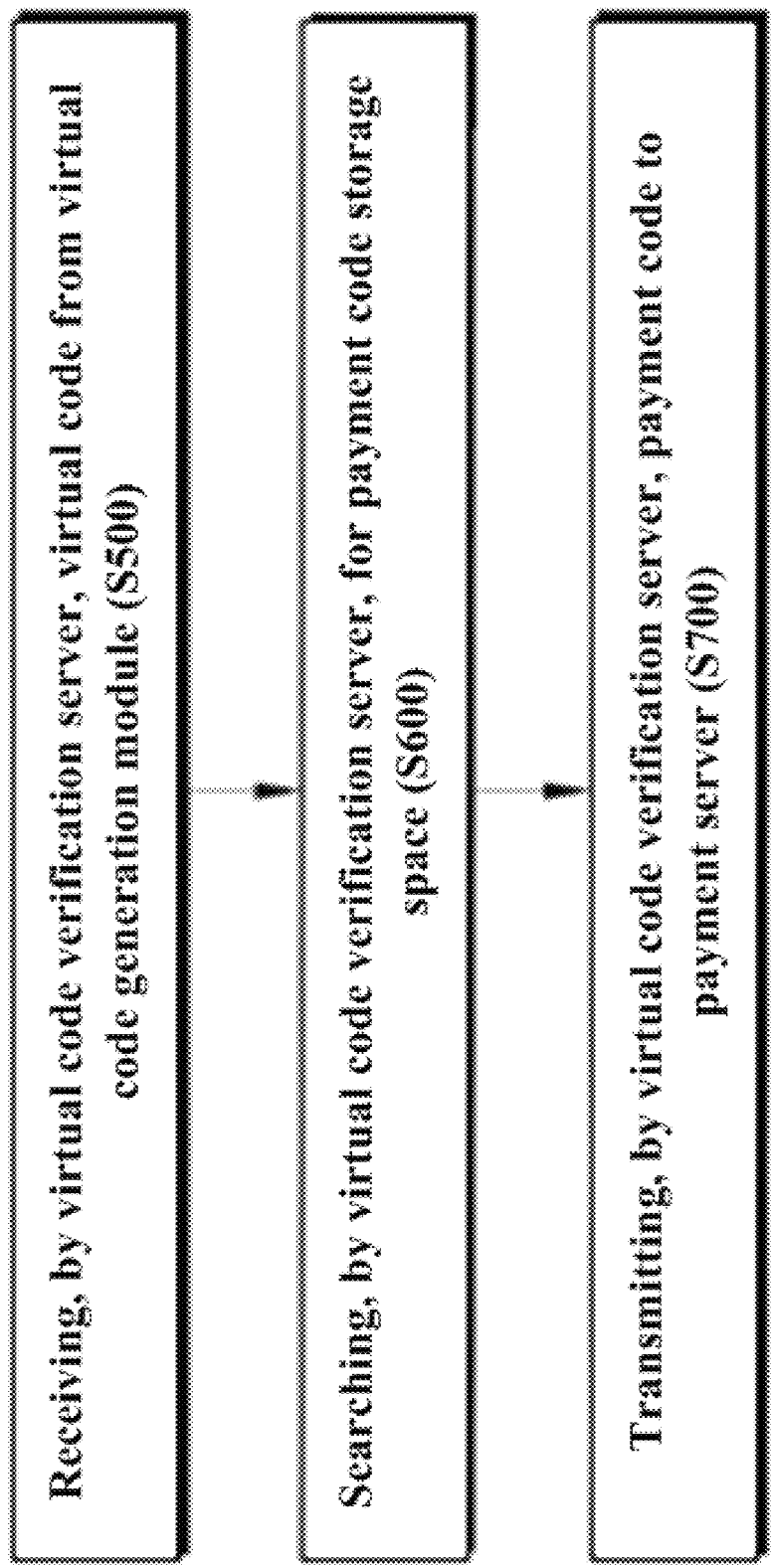
FIG. 5 is a flowchart schematically illustrating a method of providing a financial transaction based on a first wearable device, according to an embodiment of the present invention.

FIG. 5 is a flowchart schematically illustrating a method of providing a financial transaction based on the first wearable device 100, according to an embodiment of the present invention.

Referring to FIG. 5, a method of providing a financial transaction based on the first wearable device 100 according to an embodiment of the present invention includes step S500 of receiving, by the verification server 300, a virtual code from the virtual code generation module 200, step S600 of searching, by the verification server 300, for a payment code storage space, and step S700 of transmitting, by the verification server 300, a payment code to the payment server 400.

Step S500 is a step of receiving, by the verification server 300, the virtual code generated by the virtual code generation module 200 from the virtual code generation module 200.

At this time, the first wearable device 100 that performs online or offline payment based on short-distance communication is registered in the virtual code generation module 200. The first wearable device 100 may not directly generate a virtual code.

That is, the first wearable device 100 provides the virtual code generation module 200 with code data used as seed data for generating a virtual code without directly generating the virtual code. The virtual code is generated by the virtual code generation module 200.

In the meantime, in a process of making a payment, the first wearable device 100 does not directly expose the payment code (e.g., code data, which is assigned to the wearable device and which is used to make a payment, or an actual card number matched with the wearable device) to the outside. That is, in a process of making a payment by using the first wearable device 100, the payment code may be only transmitted and received in a form of data, and the payment code may not be visually identified from the outside. In this way, it is possible to prevent damages such as a fraudulent payment that may occur when the payment code is exposed to the outside.

For example, even when the first wearable device 100 needs to output a virtual code or payment code to the outside through a visual method for the purpose of making an online payment, the first wearable device 100 may not directly output the virtual code or payment code, but the virtual code generation module 200 may output the virtual code or payment code to the outside Step S600 is a step of searching, by the verification server 300, for the payment code storage space based on the virtual code received from the virtual code generation module 200. That is, the verification server 300 searches for a UID assigned to the first wearable device 100 based on the received virtual code, and searches for a storage space connected to the found UID. The detailed description of the search process is the same as the above-mentioned description, and thus are omitted to avoid redundancy.

Step S700 is a step of extracting, by the verification server 300, the payment code stored in the found payment code storage space and transmits the payment code to the payment server 400. As described above, when the verification server 300 and the payment server 400 are integrated into one server, step S700 may be omitted.

Figure 6:
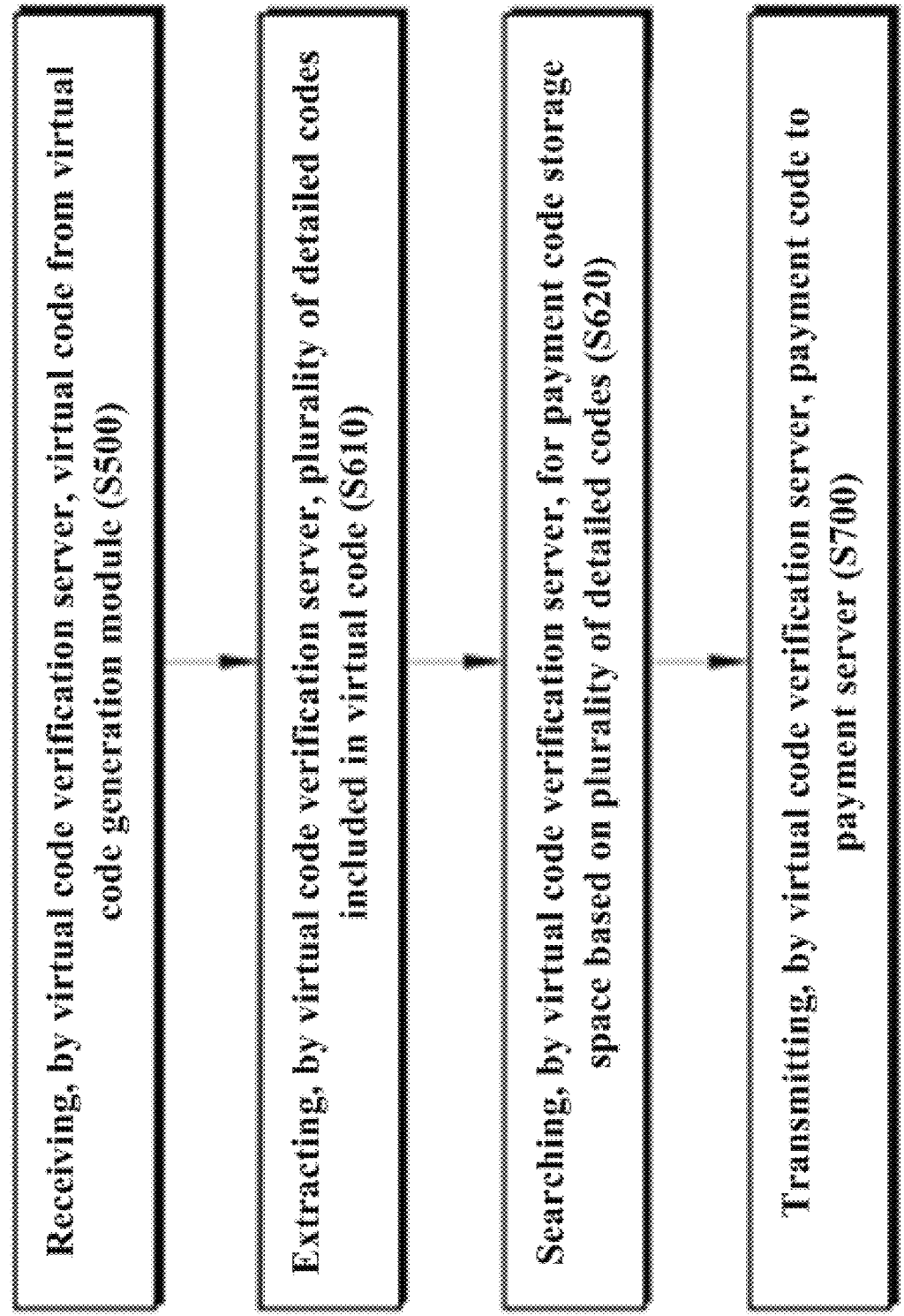
FIG. 6 is a flowchart schematically illustrating a method of providing a wearable device-based financial transaction including a detailed step of searching for a payment code storage space, according to an embodiment of the present invention.

FIG. 6 is a flowchart schematically illustrating a method of providing a wearable device-based financial transaction including a detailed step of searching for a payment code storage space, according to an embodiment of the present invention.

Referring to FIG. 6, step S600 of FIG. 5 includes step S610 of extracting, by the verification server 300, a plurality of detailed codes included in a virtual code, and step S620 of searching, by the verification server 300, for a payment code storage space based on the plurality of detailed codes.

When the virtual code is generated by combining the plurality of detailed codes, the verification server 300 extracts the plurality of detailed codes included in the virtual code, and searches the payment code storage space based on the correlation between the plurality of detailed codes. The detailed description of the search process is the same as the above-mentioned description, and thus are omitted to avoid redundancy.

Figure 7:
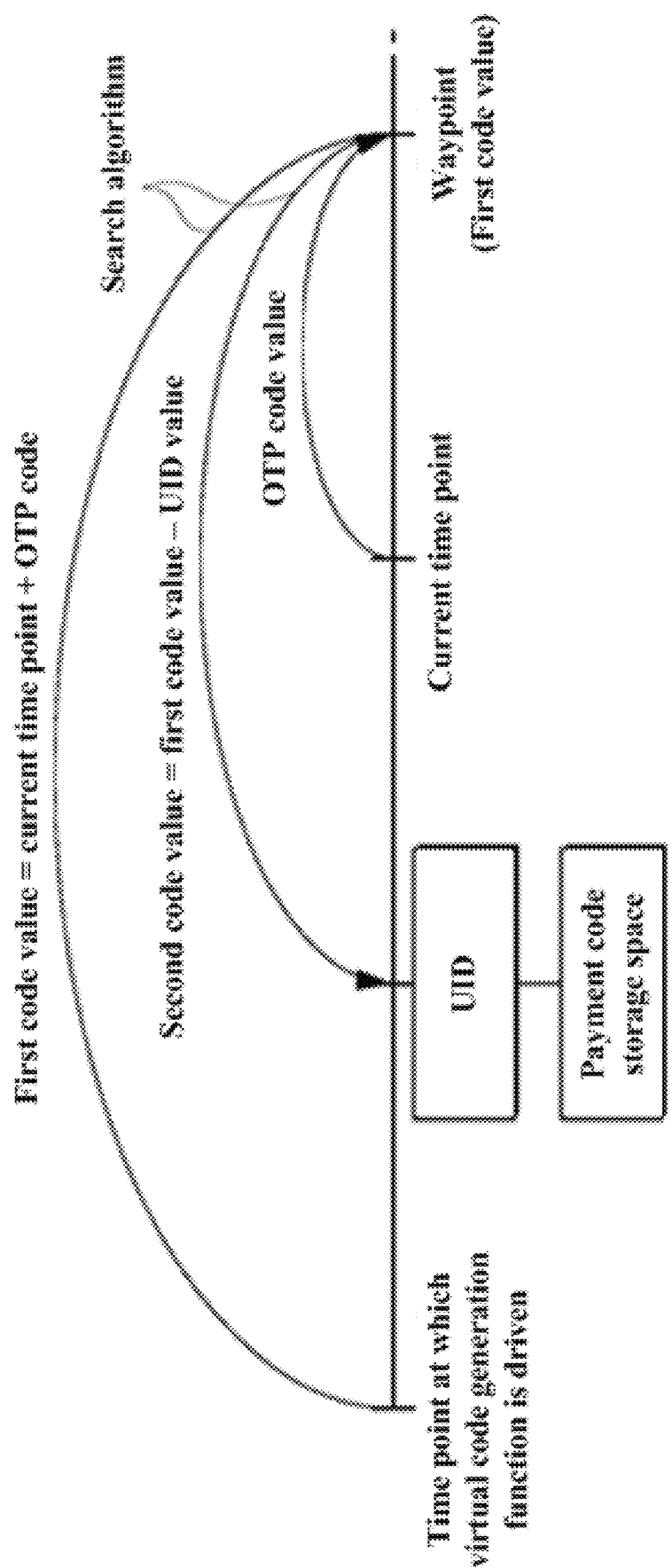
FIG. 7 is an exemplary diagram of a storage space search algorithm for searching for a payment code storage space by moving on a track based on a detailed code, according to an embodiment of the present invention.

FIG. 7 is an exemplary diagram of a storage space search algorithm for searching for a payment code storage space by moving on a track based on a detailed code, according to an embodiment of the present invention.

In an embodiment, the verification server 300 includes a search algorithm. The search algorithm searches for a payment code storage space by moving to a point matching a UID assigned to a wearable device during a movement on a track based on a plurality of detailed codes constituting a virtual code.

Referring to FIG. 7, the virtual code includes a first code and a second code, as a plurality of detailed codes generated based on a time elapsing from a point in time when a virtual code generation function is driven.

As a specific example of the first code and the second code, a code value (a first code value) corresponding to the first code may be a value obtained by adding an OTP code value to a count corresponding to a current time point based on the point in time when a virtual code generation function is driven. The first code value operates as a waypoint in a process of searching for an actual code. A code value (a second code value) corresponding to the second code may be a value obtained by subtracting a storage location value of an actual code from the first code value. The second code value is a count from a waypoint (the first code value) to the storage location value of the actual code.

That is, an embodiment of the first code and second code generated by the virtual code generation module 200 is as follows.

First code=current time count+OTP code

Second code=first code−storage location value of actual code

The OTP code is a code generated by an OTP code generation function included in the detailed code generation function, and is a code generated differently every time point. Accordingly, the detailed code according to an embodiment of the present invention may be generated differently depending on a generation time point of the virtual code. Accordingly, it is possible to prevent the detailed code from being identically generated and to enhance security.

As another specific example of the first code and the second code, the code value (the first code value) corresponding to the first code may be a value obtained by adding a UID value to an OTP code value. The code value (the second code value) corresponding to the second code may be an OTP code value. At this time, the UID value is a code value, which is assigned to a wearable device at a specific point in time (e.g., a product manufacturing time, a user registration time, a payment method registration time, or the like) and which is used to identify each wearable device or user.

That is, another embodiment of the first code and second code generated by the virtual code generation module 200 is as follows.

First code=OTP code+UID

Second code=OTP code

As illustrated in FIG. 7, the verification server 300 passes a count on a track matching the first code value as a waypoint, searches for a point matching a UID assigned to the first wearable device 100 by moving along the track in a direction set by the count corresponding to the second code value, and searches the payment code storage space connected to the UID.

Figure 8:
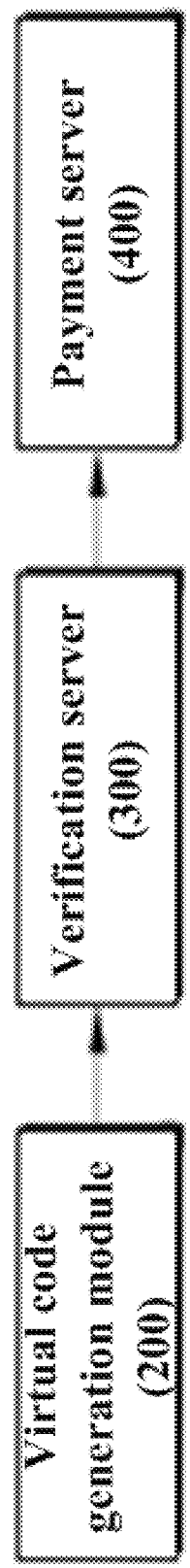
FIG. 8 is a block diagram of a system for providing a financial transaction based on a user terminal or a second wearable device, according to an embodiment of the present invention.

FIG. 8 is a block diagram of a system for providing a financial transaction based on a user terminal or a second wearable device, according to an embodiment of the present invention.

Referring to FIG. 8, in a system that provides financial transaction based on a second wearable device according to an embodiment of the present invention, a process of performing a financial transaction is as follows. The virtual code generation module 200 generates a virtual code and transmits the virtual code to the verification server 300. The verification server 300 searches for a payment code storage space based on the virtual code received from the virtual code generation module 200, extracts the payment code stored in the corresponding storage space, and transmits the extracted payment code to the payment server 400. The payment server 400 performs a financial transaction based on the payment code received from the verification server 300.

In an embodiment, the virtual code generation module 200 is a user terminal or the second wearable device (e.g., a smart watch). That is, unlike the first wearable device 100, the second wearable device may be a wearable device capable of directly generating a virtual code, and may directly operate as the virtual code generation module 200.

The verification server 300 receives the virtual code generated by the user terminal or receives the virtual code generated by the second wearable device. The verification server 300 searches for a storage space which is connected to a UID assigned to the user terminal or the second wearable device and in which a payment code is stored, based on the received virtual code. The verification server 300 extracts the payment code stored in the found storage space and transmits the extracted payment code to the payment server 400. At this time, the virtual code may be a random code changed per unit time and may include information for searching for the storage space where the payment code is stored. The payment code may be code data or an actual card number for generating a financial transaction.

In an embodiment, the user terminal or the second wearable device may generate the virtual code and then may transmit the virtual code to the payment server 400 or output the virtual code to the outside. For example, when an offline payment is made, the user terminal or the second wearable device generates the virtual code, and transmits the generated virtual code through short-distance communication with a merchant terminal.

As another example, when an online payment is made, the user terminal or the second wearable device generates the virtual code, and outputs the generated virtual code to the outside through a display unit. A user may request a payment by transmitting the virtual code to the verification server 300 or the payment server 400 through a process of visually identifying and entering the virtual code output to the outside.

The content described in an embodiment of the first wearable device 100 may be identically applied to a rule and method, in which the virtual code generation module 200 generates the virtual code, and a rule and method, in which the verification server 300 searches for a payment code storage space based on the received virtual code. The description of the aforementioned content will be omitted to avoid redundancy.

Figure 9:
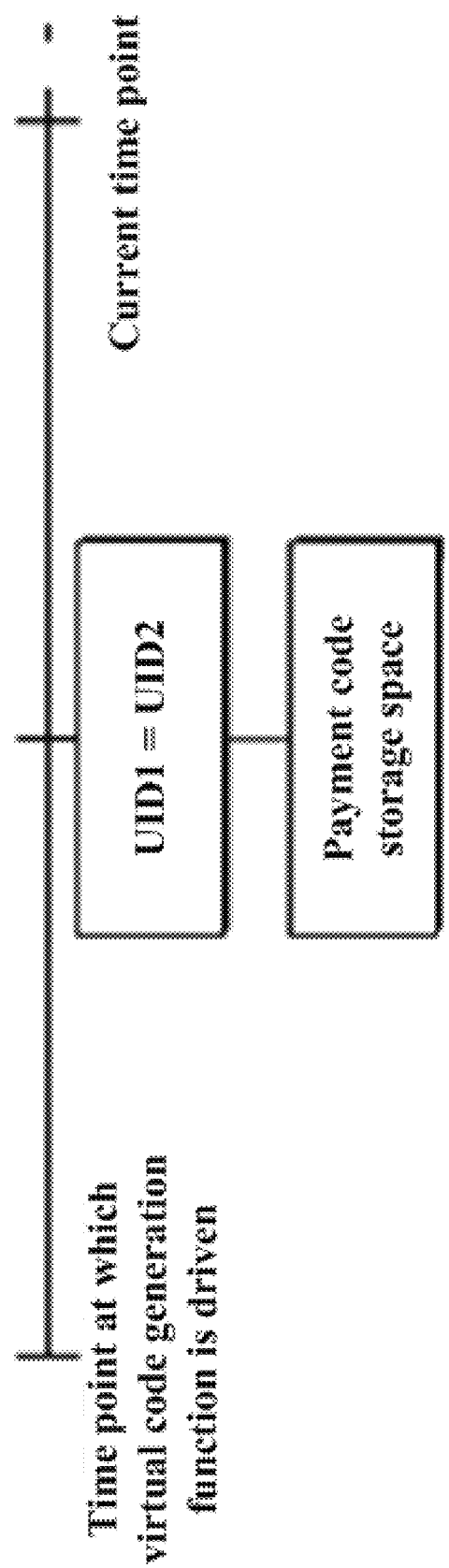
FIG. 9 is an exemplary diagram illustrating that UIDs assigned to a user terminal and a second wearable device are the same as each other, according to an embodiment of the present invention.
Figure 10:
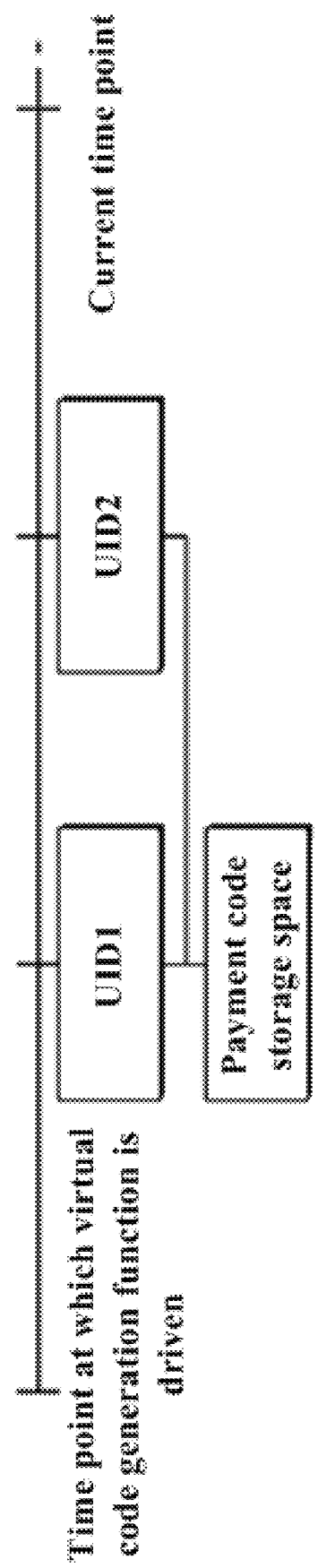
FIG. 10 is an exemplary diagram illustrating that UIDs assigned to a user terminal and a second wearable device are different from each other, according to an embodiment of the present invention.

FIG. 9 is an exemplary diagram illustrating that UIDs assigned to a user terminal and a second wearable device are the same as each other, according to an embodiment of the present invention. FIG. 10 is an exemplary diagram illustrating that UIDs assigned to a user terminal and a second wearable device are different from each other, according to an embodiment of the present invention.

Each of a user terminal and a second wearable device receives a UID based on a specific point in time (e.g., a product manufacturing time, a user registration time, a payment method registration time, or the like). Also, a storage space may be connected to the UID. That is, the verification server 300 searches for a payment code storage space by searching for a UID matched based on the virtual code received from the virtual code generation module 200, and searching for a storage space connected to the found UID.

The user terminal and the second wearable device may be purchased and registered at the same time point or at a different time point. For example, while a user purchases, registers, and utilizes the user terminal, the user may additionally purchase and register the second wearable device (e.g., a smart watch). At this time, the user terminal and the second wearable device receive each UID. A storage space of the user terminal is connected to the UID of the user terminal, and a storage space of the second wearable device is connected to the UID of the second wearable device. Accordingly, the user terminal and the second wearable device may be independent of each other. In this case, it is inefficient because an unnecessary procedure (e.g., entering and registering payment information or assigning a payment code) needs to be repeated and a payment code needs to be assigned to each device (the user terminal and the second wearable device) and needs to be stored and managed in each storage space.

To solve these issues and to add devices conveniently, the present invention includes an interworking system between the user terminal (or the second wearable device) being currently used and the added second wearable device (or the user terminal).

In an embodiment of implementing the interworking system, the user terminal and the second wearable device may receive the same UID.

The same UID may be registered in the user terminal and the second wearable device regardless of the time of purchase or registration. For example, when the second wearable device is added while the user terminal receives a UID and stores and manages a payment code in a storage space connected to the assigned UID, the second wearable device may receive the same UID as the UID of the user terminal, and may share the storage space connected to the same UID as the UID of the user terminal with the user terminal. In this way, the user terminal and the second wearable device may store and manage the same payment code in the same storage space. That is, each of the user terminal and the second wearable device may make a payment by using the same UID and the same payment code. Accordingly, there is no need to repeat unnecessary procedures and to generate an additional payment code.

As a specific example in which the user terminal and the second wearable device receive the same UID, the same UID may be assigned through an account connected to the user terminal and the second wearable device. A UID is set for the user's account, and the user logs in with the same account to each of the user terminal and the second wearable device. Accordingly, the same UID set for the user's account may be received. In this case, even when a plurality of devices are added, the same UID may be conveniently assigned by using one integrated account.

As another specific example in which the user terminal and the second wearable device receive the same UID, the first user terminal (e.g., a smart phone) owned by a user in a state where the first user terminal has already received a UID may share the UID with the added device, and thus the added device may obtain the same UID. That is, the second wearable device may receive the same UID by receiving and storing a UID from a terminal owned by the user.

As still another specific example in which the user terminal and the second wearable device receive the same UID, the user terminal owned by the user may transmit a virtual code, which is generated by the user terminal, to a server, and thus the second wearable device may receive the same UID. In other words, the user terminal owned by the user generates a virtual code at a current point in time and transmits the virtual code to the second wearable device. The second wearable device transmits the received virtual code to the server. The server may search for a UID, which is assigned to the user terminal owned by the user, based on the virtual code received from the second wearable device, and may assign the same UID as the found UID to the second wearable device.

As another embodiment implementing an interworking system, the user terminal and the second wearable device may receive different UIDs. Each of the different UIDs may be connected to the same storage space.

For example, the user terminal receives the first UID and the second wearable device receives the second UID. The first UID and the second UID may be connected to the same storage space. That is, UIDs assigned to the user terminal and the second wearable device are different from each other. No matter which UID is found among the first UID or the second UID, the found UID may be connected to the same storage space, and the same payment code stored in the corresponding storage space may be extracted. In this way, it is possible to conveniently add a device for making a payment and to interlock and manage the added device without repeating unnecessary procedures and generating an additional payment code.

The steps of a method or algorithm described in connection with the embodiments of the present invention may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the present invention pertains.

Although embodiments of the present invention have been described herein with reference to accompanying drawings, it should be understood by those skilled in the art that the present invention may be embodied in other specific forms without departing from the spirit or essential features thereof. Therefore, the above-described embodiments are exemplary in all aspects, and should be construed not to be restrictive.

According to an embodiment of the present invention, a virtual code for searching for a storage space where a payment code is stored is not matched with any other virtual code regardless of a point in time when the virtual code is generated, and thus a financial transaction such as a secure payment may be performed. In addition, it is possible to safely make a payment online as well as offline by using a wearable device.

Furthermore, according to an embodiment of the present invention, when a user adds a wearable device, it is possible to conveniently add a payment device while security is maintained, by setting a user ID (UID) of a user terminal to be the same as a UID of the wearable device or sharing a payment code storage space even though different UIDs are respectively assigned to the user terminal and the wearable device.

Moreover, according to an embodiment of the present invention, a virtual code generation function is stored only in a virtual code generation module generating a virtual code, and an algorithm for searching for an actual card number is added only to a device (e.g., a token service server, a finance company server, or the like) extracting a payment code by using a virtual code. Accordingly, it is possible to prevent an algorithm for generating and verifying the virtual code from being leaked.

Besides, according to an embodiment of the present invention, an algorithm for generating a virtual code and searching for a payment code storage space is added only to a virtual code generation device and a virtual code verification device, thereby maintaining a conventional process as it is. For example, when an application providing a financial transaction service generates and provides a virtual code that is not matched with any other virtual code, a POS device and a PG server may transmit the virtual code to a payment server (e.g., a token service server, a finance company server, or the like) while being maintained as it is, and then the payment server may make a payment by searching for a storage space of a payment code corresponding to the virtual code. As such, a portion to be changed in the conventional process may be minimized to increase security and a user does not need to perform an additional step to improve security.

The effects of the present present invention are not limited to the aforementioned effects, and other effects not mentioned herein will be clearly understood from the following description by those skilled in the art to which the present invention pertains.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method comprising:
   providing a financial transaction performed by a verification server including a hardware processor that performs a virtual code verification, by using a wearable device that is a hardware device,
   wherein the providing comprises:
   receiving a virtual code generated by a virtual code generation module, which stores registration information regarding the wearable device that performs an offline payment based on short-range communication;
   searching for a storage space, in which the payment code of the wearable device is stored, based on the virtual code; and
   transmitting the payment code to a payment server,
   wherein the virtual code is a random code changed per unit time and includes information for searching for the storage space where the payment code is stored, and
   wherein the payment code is code data assigned to the wearable device or an actual card number matching the wearable device, and the wearable device does not display the payment code on the wearable device.

2. The method of claim 1, wherein the virtual code is generated by a virtual code generation function based on seed data obtained as being tagged by the wearable device in the virtual code generation module.

3. The method of claim 2, wherein the virtual code is output to the outside by the virtual code generation module to make an online payment, and
wherein the receiving of the virtual code includes:
receiving the virtual code output to the outside.

4. The method of claim 2, wherein the wearable device is registered based on a partnership with each wearable device company.

5. The method of claim 2, wherein the virtual code is generated by combining a plurality of detailed codes,
wherein the plurality of detailed codes have a correlation for searching for the storage space, and
wherein the searching for the storage space includes:
extracting, by a storage space search algorithm included in the verification server, the plurality of detailed codes included in the virtual code; and
searching for the storage space connected to a user identification (UID) assigned to the wearable device based on the plurality of detailed codes.

6. The method of claim 5, wherein the storage space search algorithm searches for the storage space by passing waypoints corresponding to one or more detailed codes among the plurality of detailed codes and performing a calculation based on a correlation between the plurality of detailed codes from the waypoints.

7. The method of claim 6, wherein the plurality of detailed codes include a first code and a second code, and
wherein the storage space search algorithm searches for the storage space by passing a waypoint corresponding to the first code and performing a calculation based on a correlation between the first code and the second code from the waypoint.

8. A server comprising:
a hardware processor configured to perform a virtual code verification, by using a wearable device that is a hardware device;
a virtual code reception unit configured to receive a virtual code generated by a virtual code generation module, which stores registration information regarding the wearable device that performs an offline payment based on short-range communication;
a storage space search unit configured to search for a storage space, in which the payment code of the wearable device is stored, based on the virtual code; and
a payment code transmission unit configured to transmit the payment code to a payment server,
wherein the virtual code is a random code changed per unit time and includes information for searching for the storage space where the payment code is stored, and
wherein the payment code is code data assigned to the wearable device or an actual card number matching the wearable device, and the wearable device does not display the payment code on the wearable device.

9. A wearable device comprising:
a hardware processor configured to provide a financial transaction by communicating with a verification server that is a hardware server that performs a virtual code verification;
a detailed code generation unit configured to generate a plurality of detailed codes;
a virtual code generation unit configured to generate a virtual code by combining the plurality of detailed codes; and
a virtual code provision unit configured to transmit the virtual code to a payment server or to output the virtual code to an outside,
wherein the virtual code is a random code changed per unit time,
wherein the plurality of detailed codes have a correlation for searching for a storage space, which is connected to a UID assigned to a user terminal or a wearable device and in which a payment code is stored, and
wherein the payment code is code data or an actual card number for generating the financial transaction, and the wearable device does not display the payment code on the wearable device.

10. A non-transitory computer readable recording medium storing a computer program coupled to a computer device including a processor to execute a program configured to perform the method of claim 1.

* * * * *